US011130826B2

(12) United States Patent
Lafaquiere et al.

(10) Patent No.: US 11,130,826 B2
(45) Date of Patent: *Sep. 28, 2021

(54) PREFORMED CATALYTIC SYSTEM COMPRISING A RARE EARTH METAL METALLOCENE

(71) Applicant: COMPAGNIE GENERALE DES ETABLISSEMENTS MICHELIN, Clermont-Ferrand (FR)

(72) Inventors: Vincent Lafaquiere, Clermont-Ferrand (FR); Julien Thuilliez, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 186 days.

This patent is subject to a terminal disclaimer.

(21) Appl. No.: 16/461,778

(22) PCT Filed: Nov. 28, 2017

(86) PCT No.: PCT/FR2017/053266
§ 371 (c)(1),
(2) Date: May 16, 2019

(87) PCT Pub. No.: WO2018/100279
PCT Pub. Date: Jun. 7, 2018

(65) Prior Publication Data
US 2019/0359742 A1    Nov. 28, 2019

(30) Foreign Application Priority Data
Nov. 30, 2016  (FR) ...................................... 16/61680

(51) Int. Cl.
| | | |
|---|---|---|
| *C08F 4/52* | (2006.01) | |
| *C08F 4/56* | (2006.01) | |
| *C08F 236/04* | (2006.01) | |
| *C08F 236/06* | (2006.01) | |
| *B01J 31/22* | (2006.01) | |
| *C08F 10/02* | (2006.01) | |
| *C08F 12/08* | (2006.01) | |
| *C08F 36/06* | (2006.01) | |
| *C08F 36/08* | (2006.01) | |

(52) U.S. Cl.
CPC .............. *C08F 10/02* (2013.01); *C08F 12/08* (2013.01); *C08F 36/06* (2013.01); *C08F 36/08* (2013.01)

(58) Field of Classification Search
CPC .. C08F 4/52; C08F 4/56; C08F 236/04; C08F 236/06; B01J 31/2295
See application file for complete search history.

(56) References Cited

U.S. PATENT DOCUMENTS

| | | |
|---|---|---|
| 3,794,604 A | 2/1974 | Throckmorton et al. |
| 6,569,799 B1 | 5/2003 | Barbotin et al. |
| 6,875,826 B1 | 4/2005 | Huovinen et al. |
| 2003/0004287 A1 | 1/2003 | Barbotin et al. |
| 2009/0182104 A1 | 7/2009 | Thuilliez et al. |
| 2010/0022725 A1 | 1/2010 | Thuilliez et al. |

FOREIGN PATENT DOCUMENTS

| | | |
|---|---|---|
| EP | 1092731 A1 | 4/2001 |
| WO | 9916797 A1 | 4/1999 |
| WO | 2007054223 A2 | 5/2007 |
| WO | 2007054224 A2 | 5/2007 |

OTHER PUBLICATIONS

International Search Report and Written Report corresponding to PCT/FR2017/053266 dated Jan. 18, 2018.

*Primary Examiner* — Caixia Lu
(74) *Attorney, Agent, or Firm* — Dickinson Wright PLLC

(57) ABSTRACT

A catalytic system based at least on a preformation monomer selected from the group consisting of 1,3-dienes, ethylene, α-olefins and their mixtures, on a metallocene of formula {P(Cp)(Flu)LnG} and on an organometallic compound as cocatalyst is provided. In the formula, Ln denotes a metal atom which is a rare earth metal, G denotes a group comprising the borohydride $BH_4$ unit or denotes a halogen atom X selected from the group consisting of chlorine, fluorine, bromine and iodine, Cp denotes a cyclopentadienyl group of formula $C_5H_4$, Flu denotes a fluorenyl group of formula $C_{13}H_8$, P being a group bridging the two Cp and Flu groups and comprising a silicon or carbon atom. Such a catalytic system exhibits an improved stability of the catalytic activity over time, in particular on storage.

21 Claims, No Drawings

PREFORMED CATALYTIC SYSTEM COMPRISING A RARE EARTH METAL METALLOCENE

This application is a 371 national phase entry of PCT/FR2017/053266 filed on 28 Nov. 2017, which claims benefit of French Patent Application No. 16/61680, filed 30 Nov. 2016, the entire contents of which are incorporated herein by reference for all purposes.

BACKGROUND

1. Technical Field

The present invention relates to a preformed catalytic system based on rare earth metal metallocenes, which system can be used in particular in the polymerization of monomers, such as conjugated dienes, ethylene, α-olefins and their mixtures. The invention also relates to a process for the preparation of the said catalytic system and to its use in the synthesis of polymers.

2. Related Art

Catalytic systems based on rare earth metal metallocenes are known: they are, for example, described in Patent Applications EP 1 092 731 and WO 2007054223, to be used in the polymerization of monomers, such as conjugated dienes, ethylene and α-olefins. They are the reaction products of a lanthanide metallocene and of a cocatalyst in a hydrocarbon solvent. These catalytic systems, thus formed, have the disadvantage of experiencing a decrease in their catalytic activity on storage. In order to guarantee the specifications of the polymer to be synthesized, it is then necessary, in the polymerization process, to compensate for the fluctuations in the catalytic activity of the catalytic system which result from its storage. This compensation involves the readjustment of the parameters of the polymerization process, such as the respective amounts of the monomers and of the catalytic system. It follows that a phase of adjustment of the parameters of the polymerization process and a phase of stabilization of the polymerization device are required before the device is in a position to produce the polymer to specification. These adjustment and stabilization phases have the effect of reducing the productive output of the production device and of complicating the running of the polymerization device.

Nevertheless, some of these catalytic systems are of advantage in so far as they make it possible to access copolymers having a specific microstructure. It is thus of advantage to find a solution for improving the stability over time of the catalytic activity of these catalytic systems, in particular the stability on storage.

SUMMARY

A catalytic system based on a rare earth metal metallocene exhibiting an improved stability of the catalytic activity on storage has been discovered, which makes it possible to solve the abovementioned problems encountered. The catalytic system according to the invention has the distinguishing feature of being a catalytic system of "preformed" type.

Thus, a first subject-matter of the invention is a catalytic system based at least:
  on a preformation monomer selected from the group consisting of 1,3-dienes, ethylene, α-olefins and their mixtures,
  on a metallocene of formula (I),
  on an organometallic compound as cocatalyst,

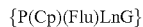
{P(Cp)(Flu)LnG}    (I)

Ln denoting a metal atom which is a rare earth metal,
G denoting a group comprising the borohydride $BH_4$ unit or denoting a halogen atom selected from the group consisting of chlorine, fluorine, bromine and iodine,
Cp denoting a cyclopentadienyl group of formula $C_5H_4$,
Flu denoting a fluorenyl group of formula $C_{13}H_8$,
P being a group bridging the two Cp and Flu groups and comprising a silicon or carbon atom.

The invention also relates to a process for preparing the catalytic system in accordance with the invention.

The invention also relates to a process for the preparation of a polymer which comprises the polymerization of a monomer in the presence of the catalytic system in accordance with the invention.

I. DETAILED DESCRIPTION OF EXAMPLE EMBODIMENTS

In the present description, any interval of values denoted by the expression "between a and b" represents the range of values greater than "a" and lower than "b" (that is to say, limits a and b excluded), whereas any interval of values denoted by the expression "from a to b" means the range of values extending from "a" up to "b" (that is to say, including the strict limits a and b).

The compounds mentioned in the description can be of fossil or biobased origin. In the latter case, they may partially or completely result from biomass or be obtained from renewable starting materials resulting from biomass. The monomers are concerned in particular.

The expression "based on" used to define the constituents of the catalytic system is understood to mean the mixture of these constituents, or the product of the reaction of a portion or of all of these constituents with one another.

The catalytic system in accordance with the invention has the essential characteristic of being a catalytic system preformed from a monomer selected from the group consisting of 1,3-dienes, ethylene, α-olefins and their mixtures. The 1,3-diene used as preformation monomer can be a 1,3-diene or a mixture of 1,3-dienes having from 4 to 8 carbon atoms, preferably 1,3-butadiene or isoprene. The α-olefin used as preformation monomer can be aliphatic, such as a 1-alkene, or else aromatic, such as styrene or a styrene, a carbon atom of the benzene ring of which, other than the carbon bearing the vinyl group, is substituted by an alkyl. Particularly preferably, the preformation monomer is 1,3-butadiene, isoprene, ethylene, styrene or their mixtures, such as a mixture of styrene and of a monomer chosen from 1,3-butadiene, isoprene and ethylene.

The preformation conjugated diene monomer is preferably used according to a (preformation conjugated diene monomer/metal of the metallocene) molar ratio ranging from 5 to 1000, preferably from 10 to 500.

The metallocene used as base constituent in the catalytic system in accordance with the invention corresponds to the formula (I):

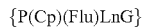
{P(Cp)(Flu)LnG}    (I)

Ln denoting a metal atom which is a rare earth metal,
G denoting a group comprising the borohydride $BH_4$ unit or denoting a halogen atom X selected from the group consisting of chlorine, fluorine, bromine and iodine,
Cp denoting a cyclopentadienyl group of formula $C_5H_4$, Flu denoting a fluorenyl group of formula $C_{13}H_8$, P being a group bridging the two Cp and Flu groups and comprising a silicon or carbon atom.

In the formula (I), the rare earth metal atom is connected to a ligand molecule composed of the two Cp and Flu groups connected together by the bridge P. It should be remembered that the rare earth metals are metals and denote the element scandium, yttrium and the lanthanides, the atomic number of which varies from 57 to 71.

According to a preferred embodiment of the invention, the symbol G denotes a chlorine atom or the group of formula (II):

$$(BH_4)_{(1+y)}\text{-}L_y\text{-}N_x \qquad (II)$$

in which:
L represents an alkali metal selected from the group consisting of lithium, sodium and potassium,
N represents a molecule of an ether,
x, which is or is not an integer, is equal to or greater than 0,
y, which is an integer, is equal to or greater than 0.

Any ether which has the ability to complex the alkali metal, in particular diethyl ether and tetrahydrofuran, is suitable as ether.

According to any one of the embodiments of the invention, the metal of the metallocene of use for the requirement of invention, in the case in point the rare earth metal, is preferably a lanthanide, the atomic number of which ranges from 57 to 71, more preferably neodymium, Nd.

The bridge P connecting the Cp and Flu groups preferably corresponds to the formula $ZR^1R^2$, in which Z represents a silicon or carbon atom and $R^1$ and $R^2$, which are identical or different, each represent an alkyl group comprising from 1 to 20 carbon atoms, preferably a methyl. In the formula $ZR^1R^2$, Z advantageously denotes a silicon atom, Si.

According to a particularly preferred embodiment, the metallocene is the (dimethylsilyl)(cyclopentadienyl)(fluorenyl)neodymium borohydride of formulae (IIIa) or (IIIb):

$$[Me_2Si(Cp)(Flu)Nd(\mu\text{-}BH_4)_2Li(THF)] \qquad (IIIa)$$

$$[Me_2Si(Cp)(Flu)Nd(\mu\text{-}BH_4)(THF)] \qquad (IIIb)$$

in which Cp represents the $C_5H_4$ group and Flu represents the $C_{13}H_8$ group.

Another base constituent of the catalytic system in accordance with the invention is the cocatalyst capable of activating the metallocene with regard to the polymerization, in particular in the polymerization initiation reaction. The cocatalyst is, in a well-known way, an organometallic compound. The organometallic compounds capable of activating the metallocene, such as organomagnesium, organoaluminium and organolithium compounds, may be suitable.

The cocatalyst is preferably an organomagnesium compound, that is to say a compound which exhibits at least one C—Mg bond. Mention may be made, as organomagnesium compounds, of diorganomagnesium compounds, in particular dialkylmagnesium compounds, and of organomagnesium halides, in particular alkylmagnesium halides. The diorganomagnesium compound exhibits two C—Mg bonds, in the case in point C—Mg—C; the organomagnesium halide exhibits one C—Mg bond. More preferably, the cocatalyst is a diorganomagnesium compound.

According to a particularly preferred embodiment of the invention, the cocatalyst is an organometallic compound comprising an alkyl group bonded to the metal atom. Alkylmagnesium compounds, very particularly dialkylmagnesium compounds, or alkylmagnesium halides, such as, for example, butyloctylmagnesium, dibutylmagnesium, butylethylmagnesium and butylmagnesium chloride, are particularly suitable as cocatalyst, also known as alkylating agent. The cocatalyst is advantageously butyloctylmagnesium.

The cocatalyst is used according to a (cocatalyst/metal of the metallocene) molar ratio preferably ranging from 0.5 to 20, more preferably from 1 to 10.

According to any one of the embodiments of the invention, the catalytic system preferably comprises a hydrocarbon solvent. The catalytic system can be provided in the form of a solution when it is in the presence of a hydrocarbon solvent. The hydrocarbon solvent can be aliphatic, such as methylcyclohexane, or aromatic, such as toluene. The hydrocarbon solvent is preferably aliphatic, more preferably methylcyclohexane. Generally, the catalytic system is stored in the form of a solution in the hydrocarbon solvent before being used in polymerization. It is then possible to speak of catalytic solution which comprises the catalytic system and the hydrocarbon solvent.

When the catalytic system is in solution, its concentration is defined by the content of metallocene metal in the solution. The concentration of metallocene metal has a value preferably ranging from 0.0001 to 0.05 mol/l, more preferably from 0.001 to 0.02 mol/l.

Another subject-matter of the invention is the preparation of the catalytic system described above.

The process for the preparation of the catalytic system in accordance with the invention comprises the following stages a) and b):
a) reacting, in a hydrocarbon solvent, the cocatalyst and the metallocene,
b) reacting the preformation monomer with the reaction product from stage a).

The metallocene used for the preparation of the catalytic system can be in the form of a crystalline or non-crystalline powder, or else in the form of single crystals. The metallocene can be provided in a monomer or dimer form, these forms depending on the method of preparation of the metallocene, as for example is described in Application WO 2007054224 A2. The metallocene can be prepared conventionally by a process analogous to that described in the documents EP 1 092 731 and WO 2007054223, in particular by reaction, under inert and anhydrous conditions, of the salt of an alkali metal of the ligand with a rare earth metal salt, such as a rare earth metal halide or borohydride, in a suitable solvent, such as an ether, for example diethyl ether or tetrahydrofuran, or any other solvent known to a person skilled in the art. After reaction, the metallocene is separated from the reaction by-products by the techniques known to a person skilled in the art, such as filtration or precipitation from a second solvent. In the end, the metallocene is dried and isolated in the solid form.

Stage a) corresponds to the stage of activation, also commonly known as alkylation, of the metallocene by the cocatalyst; stage b) corresponds to the stage of preformation of the catalytic system.

The hydrocarbon solvent used in the preparation of the catalytic system is generally an aliphatic or aromatic hydrocarbon solvent, such as, for example, methylcyclohexane or toluene. Generally, it is identical to the solvent of the catalytic solution defined above. This is because the hydrocarbon solvent used in the preparation of the catalytic system is preferably also the solvent of the catalytic solution.

In stage a), the cocatalyst is generally added to the hydrocarbon solvent, followed by the metallocene. Stage a) generally takes place at a temperature ranging from 20° C.

to 80° C. The reaction time of stage a) is preferably between 5 and 60 minutes and more preferably varies from 10 to 20 minutes.

Stage b) is generally carried out at a temperature ranging from 40° C. to 120° C., preferably from 40° C. to 90° C. The reaction time of stage b) typically varies from 0.5 hour to 24 hours, preferably from 1 h to 12 h. In stage b), the preformation monomer is added to the reaction product from stage a).

Stage b) can be followed by a degassing stage c) in order to remove the preformation monomer which has not reacted during stage b).

Like any synthesis carried out in the presence of an organometallic compound, the synthesis takes place under anhydrous conditions under an inert atmosphere, both for stage a) and for stage b) and, if appropriate, stage c). Typically, the reactions are carried out starting from anhydrous solvents and monomers under anhydrous nitrogen or argon. Stages a), b) and c) are generally carried out with stirring.

Before being used, for example, in polymerization, the catalytic system thus obtained in solution can be stored under an inert atmosphere, for example under nitrogen or argon, in particular at a temperature ranging from −20° C. to ambient temperature (23° C.).

Another subject-matter of the invention is a process for the preparation of a polymer which comprises the polymerization of a monomer M in the presence of the catalytic system in accordance with the invention. The monomer M is to be distinguished from the preformation monomer used in the preparation of the catalytic system in stage b): the monomer M may or may not be of the same chemical nature as the monomer used in stage b). The monomer M is preferably selected from the group of the monomers consisting of conjugated dienes, ethylene, α-monoolefins and their mixtures. The conjugated diene used as monomer M is preferably a 1,3-diene having from 4 to 8 carbon atoms, more preferably 1,3-butadiene or isoprene. The α-olefin used as monomer M can be aliphatic, such as a 1-alkene, or else aromatic, such as styrene or a styrene, a carbon atom of the benzene ring of which, other than the carbon bearing the vinyl group, is substituted by an alkyl. Particularly preferably, the monomer M is 1,3-butadiene, isoprene, ethylene, styrene or their mixtures, in particular a mixture of 1,3-butadiene and of ethylene. The polymers obtained according to the process in accordance with the invention have a similar microstructure to that of the polymers already known from the state of the art and in particular obtained by the process described in Patent Application WO 2007054223 and employing a non-preformed catalytic system. According to the microstructure and the length of the polymer chains prepared by the process in accordance with the invention, the polymer can be an elastomer.

The polymerization is preferably carried out in solution, continuously or batchwise. The polymerization solvent can be an aromatic or aliphatic hydrocarbon solvent. Mention may be made, as example of polymerization solvent, of toluene and methylcyclohexane. The monomer M can be introduced into the reactor containing the polymerization solvent and the catalytic system or, conversely, the catalytic system can be introduced into the reactor containing the polymerization solvent and the monomer. The monomer and the catalytic system can be introduced simultaneously into the reactor containing the polymerization solvent, in particular in the case of a continuous polymerization. The polymerization is typically carried out under anhydrous conditions and in the absence of oxygen, in the optional presence of an inert gas. The polymerization temperature generally varies within a range extending from 40° C. to 150° C., preferably from 40° C. to 120° C.

The polymerization can be halted by cooling the polymerization medium. The polymer can be recovered according to conventional techniques known to a person skilled in the art, such as, for example, by precipitation, by evaporation of the solvent under reduced pressure or by steam stripping.

The abovementioned characteristics of the present invention, and also others, will be better understood on reading the following description of several implementational examples of the invention, given by way of illustration and without limitation.

II. EXAMPLES

II.1-Characterization of the Polymers by Size Exclusion Chromatography (SEC)

SEC analyses were carried out at high temperature (HT-SEC) using a Viscotek apparatus (Malvern Instruments) fitted with 3 columns (PLgel Olexis 300 mm×7 mm I. D., Agilent Technologies) and 3 detectors (refractometer, viscometer and light scattering). 200 µl of a solution of the sample at a concentration of 5 mg·ml$^{-1}$ were eluted in 1,2,4-trichlorobenzene using a flow rate of 1 ml·min$^{-1}$ at 150° C. The mobile phase was stabilized with 2,6-di(tert-butyl)-4-methylphenol (200 mg·l$^{-1}$). The OmniSEC software was used to acquire and analyse the data. The number-average molar masses Mn and the polydispersity index Đ were calculated by universal calibration using polystyrene standards.

II.2-Nuclear Magnetic Resonance (NMR) Spectroscopy

The microstructure of the polymers was determined by $^{13}$C NMR analysis. The spectra are acquired on a Bruker 500 MHz spectrometer equipped with a 5 mm BBFO Z-grad "broad band" Helium CryoProbe. The quantitative 1D $^{13}$C NMR experiment uses a simple 30° pulse sequence with a decoupling of the protons and a repetition time of 6 seconds between each acquisition. The samples are dissolved in deuterated chloroform. The $^{13}$C NMR spectrum is calibrated with the carbon of CDCl$_3$ at 77 ppm. The method described in Macromolecules, 2001, 34, 6304-6311, was used, the operating conditions for dissolution of the polymers described the examples being adjusted, and the chemical shifts of each unit were confirmed by 2D NMR measurements of $^1$H/$^{13}$C correlations.

II.3-Preparation of Catalytic Systems in Accordance with the Invention: Examples 1 to 14

The catalytic systems C$_1$-C$_{14}$ in accordance with the invention are prepared according to the following procedure.

The cocatalyst butyloctylmagnesium (BOMAG) and then the metallocene [Me$_2$Si(Cp)(Flu)Nd(µ-BH$_4$)$_2$(THF)] are added, in the contents shown in Table I, to a reactor containing the hydrocarbon solvent methylcyclohexane (MCH) or toluene (Tol). The activation time is 10 minutes and the reaction temperature is 20° C. (stage a)). Subsequently, the preformation monomer is introduced into the reactor in the proportion shown in Table I. The preformation reaction takes place at a temperature shown in Table I, for a period of time also shown in Table I. The preformation monomers are 1,3-butadiene (But), isoprene (Iso), ethylene (Eth) or styrene (Sty), as shown in Table I. The metallocene can be prepared according to the procedure described in Patent Application WO 2007054223.

II.4-Preparation of Catalytic Systems not in Accordance with the Invention: Examples 15 to 17

The catalytic system CE1-1 not in accordance with the invention is prepared according to the process disclosed in Patent Application WO 2007054223 and described below:

The cocatalyst butyloctylmagnesium (BOMAG) and then the metallocene [Me$_2$Si(Cp)(Flu)Nd(μ-BH$_4$)(THF)] are added, in the contents shown in Table II, to a reactor containing toluene (Tol). The activation time is 10 minutes and the reaction temperature is 20° C. Its preparation conditions appear in Table II.

The catalytic system CE1-2 not in accordance with the invention is prepared in a similar way to the catalytic system CE1-1 except for the solvent, which is methylcyclohexane.

The catalytic system CE1-3 not in accordance with the invention is prepared according to the following procedure:

The cocatalyst butyloctylmagnesium (BOMAG) and then the metallocene [Me$_2$Si(Cp)(Flu)Nd(μ-BH$_4$)(THF)] are added, in the contents shown in Table II, to a reactor containing the hydrocarbon solvent methylcyclohexane (MCH). The activation time is 1 h and the reaction temperature is 60° C.

The catalytic systems CE1-1, CE1-2 and CE1-3 are not in accordance with the invention due to the absence of the preformation stage (stage b)). These are catalytic systems known from the state of the art, in particular from Patent Application WO 2007054223. The catalytic systems CE1-1 and CE1-2 are formed "in situ": in other words, the activation reaction takes place directly in the solvent which will serve as polymerization solvent; the monomers to be polymerized are then added to the polymerization solvent containing the catalytic system formed in situ. For CE1-3, the constituents of the catalytic system CE1-3 are premixed in the presence of a solvent in which the activation reaction takes place to form a catalytic solution comprising 0.005 mol/l of metallocene; it is this catalytic solution which is added to the polymerization solvent. This catalytic solution does not contain preformation monomers.

II.5-Conditions for Storage of the Catalytic Systems

Unless otherwise indicated, the catalytic systems C1 to C14 in accordance with the invention are stored immediately after their preparation in bottles which are hermetically closed under a nitrogen atmosphere at −20° C.

For the study of the stability of the catalytic activity on storage of a catalytic system in accordance with the invention, bottles which are hermetically closed under nitrogen containing the catalytic systems C$_3$, C$_6$, C$_9$, C$_{10}$, C$_{11}$ and C$_{14}$ are also stored at 23° C.

The catalytic systems CE1-1 and CE1-2 not in accordance with the invention are not stored and are used at once in the polymer synthesis in order to determine their catalytic activities.

The catalytic system CE1-3 not in accordance with the invention, if it is not used at once in the polymer synthesis, is stored immediately after its preparation in bottles which are hermetically closed under a nitrogen atmosphere at 23° C.

II.6-Stability of the Catalytic Activities of the Catalytic Systems: Examples 18 to 31

The catalytic systems are used in polymerization without having been stored after their synthesis or after having been stored at ambient temperature (23° C.) for variable periods of time. The catalytic activities of the catalytic systems are determined, according to whether or not they have been stored, under the polymerization conditions described below. The polymerization is carried out at 80° C. and at an initial pressure of 4 bar in a 500-ml glass reactor containing 300 ml of polymerization solvent methylcyclohexane, the catalytic system (67 μmol of neodymium metal) and the monomers, the monomers 1,3-butadiene and ethylene being introduced in the form of a gas mixture containing 20 mol % of 1,3-butadiene. All the tests were carried out with a total BOMAG content of 5 molar equivalents with respect to the neodymium, which led, for some tests, to a supplementary addition of BOMAG to the reactor at the same time as the catalytic system. The polymerization reaction is halted by cooling, degassing of the reactor and addition of 10 ml of ethanol. An antioxidant is added to the polymer solution. The copolymer is recovered by drying in an oven under vacuum. The weight weighed makes it possible to determine the mean catalytic activity of the catalytic system, expressed in kilograms of copolymer synthesized per mole of neodymium metal and per hour (kg/mol·h).

The results for catalytic activity according to the storage time and the storage temperature of the catalytic system in solution appear in Table III.

It is observed that the catalytic activities of the catalytic systems in accordance with the invention are the same before or after storage. Even storage for more than 2 months at 23° C. has no effect in decreasing the catalytic activity.

On the other hand, it is observed that the catalytic system CE1-3 not in accordance with the invention does not exhibit a catalytic activity which is as stable on storage at 23° C. as the catalytic systems in accordance with the invention. This is because the catalytic system CE1-3 exhibits a decline in catalytic activity of more than 30% after 1 month of storage at 23° C.

The stability of the catalytic activity is also acquired for the different preformation monomers.

The maintenance of the catalytic activity over a long period makes it possible to use one and the same manufacturing batch of a catalytic system in accordance with the invention over this same period without having to carry out, during this period, phases of readjustment of the parameters of the polymerization process and of rendering the polymerization device stable again, while guaranteeing the specifications of the polymer to be synthesized.

II.7-Comparison of the Catalytic Activities of the Catalytic Systems in Accordance with the Invention with Those of the Catalytic Systems of the State of the Art: Examples P1 to P12, 18, 20, 22, 24, 26, 28 and 30

The catalytic systems in accordance with the invention and the catalytic systems not in accordance with the invention are each used in the polymerization of a mixture of ethylene and 1,3-butadiene according to the procedure described below.

The polymerization is carried out at 80° C. and at an initial pressure of 4 bar in a 500-ml glass reactor containing 300 ml of polymerization solvent methylcyclohexane or toluene, according to the examples, the catalytic system (67

μmol of neodymium metal) and the monomers, the monomers 1,3-butadiene and ethylene being introduced in the form of a gas mixture containing 20 mol % of 1,3-butadiene. All the tests were carried out with a total BOMAG content of 5 molar equivalents with respect to the neodymium, which led, for some tests, to a supplementary addition of BOMAG to the reactor at the same time as the catalytic system. The polymerization reaction is halted by cooling, degassing of the reactor and addition of 10 ml of ethanol. An antioxidant is added to the polymer solution. The copolymer is recovered by drying in an oven under vacuum. The weight weighed makes it possible to determine the mean catalytic activity of the catalytic system, expressed in kilograms of copolymer synthesized per mole of neodymium metal and per hour (kg/mol·h). The mean catalytic activities calculated for each of the catalytic systems appear in Tables III and IV. Examples P1 to P10, 20, 22, 24, 26, 28 and 30 are in the same for the catalytic system C2 used in polymerization in methylcyclohexane, which exhibits a catalytic activity of 34 kg/mol·h, whereas the catalytic system of the state of the art exhibits an activity of 29 kg/mol·h under the same conditions. However, it may be observed that the nature of the polymerization solvent has a strong influence on the catalytic activity measured with one and the same catalytic system. The activity observed is greater when the polymerization solvent is toluene. However, it is noted that the preformations with isoprene or styrene result in the highest catalytic activities when the polymerization is carried out in methylcyclohexane.

It is also observed that the preformation has no impact on the molar content of "ethylene" units or of "butadiene" units, with respect to the catalytic systems formed in situ or premixed (Table V).

TABLE I

| Example | Metallocene (mol/l) | Cocatalyst (mol/l) | Hydrocarbon solvent | Preformation monomer | Preformation duration | Preformation temperature (° C.) | Monomer/metal Nd molar ratio | Catalytic system |
|---|---|---|---|---|---|---|---|---|
| 1 | 0.005 | 0.011 | MCH | But | 1 | 80 | 90 | C1 |
| 2 | 0.005 | 0.011 | Tol | But | 1 | 80 | 90 | C2 |
| 3 | 0.005 | 0.011 | MCH | But | 5 | 40 | 90 | C3 |
| 4 | 0.005 | 0.011 | MCH | But | 5 | 80 | 120 | C4 |
| 5 | 0.02 | 0.044 | MCH | But | 5 | 80 | 150 | C5 |
| 6 | 0.005 | 0.011 | MCH | But | 15 | 40 | 200 | C6 |
| 7 | 0.005 | 0.005 | MCH | But | 1 | 80 | 60 | C7 |
| 8 | 0.005 | 0.025 | MCH | But | 1 | 80 | 120 | C8 |
| 9 | 0.005 | 0.011 | MCH | Iso | 5 | 80 | 90 | C9 |
| 10 | 0.005 | 0.011 | MCH | Sty | 5 | 80 | 30 | C10 |
| 11 | 0.005 | 0.011 | MCH | Sty-But* | 1 | 80 | 150 | C11 |
| 12 | 0.005 | 0.011 | MCH | Eth | 1 | 80 | 60 | C12 |
| 13 | 0.005 | 0.011 | MCH | Eth-But** | 1 | 80 | 90 | C13 |
| 14 | 0.02 | 0.044 | MCH | Eth-But** | 5 | 80 | 90 | C14 |

*Styrene/butadiene molar ratio: 30/70
**Ethylene/butadiene molar ratio: 80/20

TABLE II

| Example | Metallocene (mol/l) | Cocatalyst (mol/l) | Hydrocarbon solvent | Activation time (min) | Activation temperature (° C.) | Catalytic system |
|---|---|---|---|---|---|---|
| 15 | 0.0001 | 0.0008 | Tol | 10 | 20 | CE1-1 |
| 16 | 0.0001 | 0.0008 | MCH | 10 | 20 | CE1-2 |
| 17 | 0.005 | 0.011 | MCH | 60 | 60 | CE1-3 | accordance with the invention as they employ a catalytic system in accordance with the invention (C1 to C14); Examples P11, P12 and 18 are not in accordance with the invention as they employ a catalytic system of the state of the art (CE1-1, CE1-2 and CE1-3).

It is found that the preformation does not have an impact on the initial catalytic activity of the catalytic systems since the catalytic systems in accordance with the invention have a catalytic activity of the same order of magnitude as the catalytic systems not in accordance CE1-1, CE1-2 et CE1-3, the catalytic systems CE1-1 and CE1-2 being used immediately after their preparation (in situ type system) and the catalytic system CE1-3 being used 12 hours or 1 month after its preparation (premixed type system).

Specifically, the catalytic system C2 in accordance with the invention exhibits a catalytic activity of 77 kg/mol·h when it is used in polymerization in toluene, whereas the catalytic system of the state of the art also used in polymerization in toluene exhibits an activity of 74 kg/mol·h. It is

TABLE III

| Example | Catalytic system | Storage time (days) | Storage temperature | Polymerization solvent | Activity kg/mol · h |
|---|---|---|---|---|---|
| 18 | CE1-3 | 0 | — | MCH | 33 |
| 19 | CE1-3 | 31 | 23° C. | MCH | 22 |
| 20 | C3 | 0 | — | MCH | 29 |
| 21 | C3 | 65 | 23° C. | MCH | 34 |
| 22 | C6 | 0 | — | MCH | 27 |
| 23 | C6 | 77 | 23° C. | MCH | 26 |
| 24 | C9 | 0 | — | MCH | 36 |
| 25 | C9 | 75 | 23° C. | MCH | 45 |
| 26 | C10 | 0 | — | MCH | 35 |
| 27 | C10 | 67 | 23° C. | MCH | 42 |
| 28 | C11 | 0 | — | MCH | 30 |
| 29 | C11 | 40 | 23° C. | MCH | 29 |
| 30 | C14 | 0 | — | MCH | 26 |
| 31 | C14 | 22 | 23° C. | MCH | 25 |

TABLE IV

| Example | Catalytic system | Polymerization solvent | Activity kg/mol · h |
|---|---|---|---|
| P1 | C1 | MCH | 31 |
| P2 | C2 | toluene | 77 |
| P3 | C2 | MCH | 34 |
| P4 | C4 | MCH | 27 |
| P5 | C5 | MCH | 23 |
| P6 | C7 | MCH | 27 |
| P7 | C8 | MCH | 34 |
| P9 | C12 | MCH | 31 |
| P10 | C13 | MCH | 33 |
| P11 | CE1-1 | toluene | 74 |
| P12 | CE1-2 | MCH | 29 |

TABLE V

| Example | Mn g/mol | Dispersity | Ethylene units (mol %) | Butadiene units (mol %) |
|---|---|---|---|---|
| 18 | | | 76 | 24 |
| 20 | 4600 | 2.1 | 75 | 25 |
| 22 | 5700 | 2 | 70 | 30 |
| 24 | | | 77 | 23 |
| 26 | | | 76 | 24 |
| P1 | 3400 | 2.3 | 76 | 24 |
| P4 | — | | 76.4 | 23.6 |
| P5 | — | | 72.6 | 27.4 |
| P11 | 1500 | 2.2 | 77.6 | 22.4 |
| P12 | 2700 | 1.8 | 77 | 23 |

The invention claimed is:

1. A catalytic composition, comprising:
a preformation monomer selected from the group consisting of 1,3-dienes, ethylene, α-olefins and a mixture thereof,
a metallocene of formula (I),
an organometallic compound as cocatalyst, {P(Cp)(Flu)LnG}  (I)

wherein
Ln is a rare earth metal,
G is a group comprising a borohydride $BH_4$ unit or a halogen atom,
X is selected from the group consisting of chloride, fluoride, bromide, and iodide,
Cp is a cyclopentadienyl group of formula $C_5H_4$,
Flu is a fluorenyl group of formula $C_{13}H_8$, and
P is a group bridging the Cp and Flu groups and comprising a silicon or carbon atom.

2. The catalytic composition according to claim 1, wherein the cocatalyst is an organomagnesium compound.

3. The catalytic composition according to claim 1, wherein the cocatalyst is an organometallic compound comprising an alkyl group bonded to the metal atom.

4. The catalytic composition according to claim 1, wherein the cocatalyst is a dialkylmagnesium compound or an alkylmagnesium halide.

5. The catalytic composition according to claim 1, wherein the preformation monomer is 1,3-butadiene, isoprene, ethylene, styrene or their mixtures.

6. The catalytic composition according to claim 1, wherein G denotes a chlorine atom or the group of formula (II):

$(BH_4)_{(1+y)}$-$L_y$-$N_x$  (II)

wherein:
L represents an alkali metal selected from the group consisting of lithium, sodium and potassium,
N represents a molecule of an ether,
x is equal to or greater than 0,
y is an integer equal to or greater than 0.

7. The catalytic composition according to claim 1, wherein the rare earth metal is a lanthanide, and the atomic number of the lanthanide varies from 57 to 71.

8. The catalytic composition according to claim 1, wherein the rare earth metal is neodymium, Nd.

9. The catalytic composition according to claim 1, wherein the bridge P has a formula $ZR^1R^2$, Z representing a silicon or carbon atom and $R^1$ and $R^2$, which are identical or different, each representing an alkyl group comprising from 1 to 20 carbon atoms.

10. The catalytic composition according to claim 9, wherein Z is Si.

11. The catalytic composition according to claim 1, wherein the metallocene is the (dimethyl silyl)(cyclopentadienyl)(fluorenyl)neodymium borohydride of formula (IIIa) or (IIIb):

[Me$_2$Si(Cp)(Flu)Nd(μ-BH$_4$)$_2$Li(THF)]  (IIIa)

[Me$_2$Si(Cp)(Flu)Nd(μ-BH$_4$)(THF)]  (IIIb)

Cp representing the $C_5H_4$ group and Flu representing the $C_{13}H_8$ group.

12. The catalytic composition according to claim 1, wherein the molar ratio of the preformation monomer to the metal of the metallocene has a value ranging from 5 to 1000.

13. The catalytic composition according to claim 1, wherein the molar ratio of cocatalyst to the metal of the metallocene has a value ranging from 0.5 to 20.

14. The catalytic composition according to claim 1, wherein the catalytic composition is in solution in a hydrocarbon solvent.

15. The catalytic composition according to claim 14, wherein the hydrocarbon solvent is aromatic or aliphatic.

16. The catalytic composition according to claim 14, wherein the molar concentration of metal of the metallocene in the catalytic composition has a value ranging from 0.0001 to 0.05 mol/l.

17. A process for the preparation of the catalytic composition defined in claim 1, the process comprising the following stages a) and b):
a) reacting, in a hydrocarbon solvent, the cocatalyst and the metallocene,
b) reacting the preformation monomer with the reaction product from stage a).

18. The process according to claim 17, wherein stage a) takes place at a temperature ranging from 20° C. to 80° C. and stage b) is carried out at a temperature ranging from 40° C. to 120° C.

19. A process for the preparation of a polymer which comprises the polymerization of a monomer in the presence of a catalytic composition defined in claim 1.

20. The process according to claim 19, wherein the monomer is selected from the group consisting of conjugated dienes, ethylene, α-olefins and a mixture thereof.

21. The process according to claim 20, wherein the monomer M is 1,3-butadiene, isoprene, ethylene, styrene or their mixtures.

* * * * *